(12) United States Patent
Takemura

(10) Patent No.: US 8,419,102 B2
(45) Date of Patent: Apr. 16, 2013

(54) CARGO NET DEVICE

(75) Inventor: Seiji Takemura, Settsu (JP)

(73) Assignee: Ashimori Industry Co., Ltd., Osaka (JP)

( * ) Notice: Subject to any disclaimer, the term of this patent is extended or adjusted under 35 U.S.C. 154(b) by 0 days.

(21) Appl. No.: 13/141,580

(22) PCT Filed: Jan. 20, 2010

(86) PCT No.: PCT/JP2010/050617
§ 371 (c)(1),
(2), (4) Date: Jun. 22, 2011

(87) PCT Pub. No.: WO2010/092858
PCT Pub. Date: Aug. 19, 2010

(65) Prior Publication Data
US 2011/0260484 A1    Oct. 27, 2011

(30) Foreign Application Priority Data

Feb. 13, 2009 (JP) ................... 2009-030959

(51) Int. Cl.
*B60R 21/06* (2006.01)
(52) U.S. Cl.
USPC ............. 296/24.43; 280/749; 160/290.1
(58) Field of Classification Search .......... 296/24.4, 296/24.43, 37.16; 280/749; 160/290.1, 266
See application file for complete search history.

(56) References Cited

U.S. PATENT DOCUMENTS

| | | | |
|---|---|---|---|
| 3,911,992 A | * | 10/1975 | Webb .............. 160/290.1 |
| 5,551,726 A | | 9/1996 | Ament |
| 2004/0130171 A1 | | 7/2004 | Zummack |

FOREIGN PATENT DOCUMENTS

| | | |
|---|---|---|
| JP | 5 44381 | 2/1993 |
| JP | 2003 48487 | 2/2003 |

OTHER PUBLICATIONS

U.S. Appl. No. 13/143,028, filed Jun. 30, 2011, Takemura.
International Search Report issued Mar. 9, 2010 in PCT/JP10/50617 filed Jan. 20, 2010.
Extended Search Report issued Aug. 21, 2012 in European Application No. 10741138.1.

* cited by examiner

*Primary Examiner* — Dennis Pedder
(74) *Attorney, Agent, or Firm* — Oblon, Spivak, McClelland, Maier & Neustadt, L.L.P.

(57) ABSTRACT

A pair of parallel pins abutting against the inner peripheral surface of a hollow shaft are provided to a first arm part of a shank at a predetermined spacing in the longitudinal direction. This prevents the shank from tilting or rattling. Further, a coil spring restricts the rotation of the shank around the first arm part and keeps the position of the shank such that an interlocking part points upward.

8 Claims, 9 Drawing Sheets

CARGO NET DEVICE

TECHNICAL FIELD

The present invention relates to a cargo net device mounted as a partition between a passenger compartment and a cargo compartment of a vehicle.

BACKGROUND ART

In a vehicle including a cargo compartment behind a passenger compartment, if the cargo is loaded on the cargo compartment exceeding the height of the back of a seat, the loaded cargo may be thrown into the passenger compartment upon, for example, sudden deceleration of the vehicle. In order to prevent the cargo from being thrown out as described above, there is known a cargo net device mounted between a passenger compartment and a cargo compartment of a vehicle.

A conventional cargo net device includes a wind-up mechanism fixed to the back of a seat, a net extended by being pulled upward from the wind-up mechanism, and a stay extended along an upper edge side of the net. The stay includes a pair of shanks capable of moving forward and backward in a longitudinal direction at both ends thereof. The portions near the outer ends of the shanks are obliquely bent, and interlocking parts interlocked to fixtures fixed to the body are formed at tips thereof.

A conventional cargo net device including a stay is disclosed in, for example, European Patent No. 0649778.

SUMMARY OF THE INVENTION

Problem to be Solved by the Invention

When a cargo net device is used, first, a stay is pulled upward to pull out a net from a wind-up mechanism. Then, interlocking parts of shanks are interlocked to the fixtures on the body while adjusting the rotation positions of the shanks such that the interlocking parts point upward. On this occasion, the interlocking parts can be easily interlocked to the fixtures by restricting the rotation positions of the shanks such that the interlocking parts always point upward.

As to this point, European Patent No. 0649778 describes that a tubular insert element is fitted inside a rod, and the rotation of a holding element including shanks is restricted by a groove in axial direction formed in the insert element and a projection formed in the holding element.

Unfortunately, in the configuration of European Patent No. 0649778, the groove in axial direction of the insert element needs to be formed over the range in which the projection formed in the holding element slides. As a result, for a rotation restrict structure, the insert element is required to have a large dimension in a longitudinal direction. Further, the insert element for restricting the rotation is provided separately from other elements, leading to a problem that the number of components increases and the stay increases in size and weight.

While, in any cases where the cargo net device is used and is not used, in order to prevent rattling noise caused by vibrations of a vehicle, there are demands for preventing the shank from tilting or rattling in the stay.

The present invention has been made in view of the above, and an object thereof is to provide a cargo net device capable of preventing a shank from tilting or rattling as well as restricting the rotation of the shank without increasing the size of a device and the number of components or increasing the weight.

Means to Solve the Problem

In order to solve the above-mentioned problem, a first aspect of the present application relates to a cargo net device mounted as a partition between a passenger compartment and a cargo compartment of a vehicle, which includes: a net; a wind-up mechanism fixed to a back of a seat of the passenger compartment or a floor of the cargo compartment and winding up the net from a lower edge thereof; a hollow shaft extended along an upper edge side of the net and mounted in the net; a fixing member fixed, in the hollow shaft, at a position predetermined length apart from an end toward a center side thereof; a shank including a first arm part inserted into the hollow shaft so as to be slidable along a longitudinal direction thereof, and a second arm part extending from an outer end of the first arm part obliquely with respect to the longitudinal direction; and a coil spring including one end fixed to the first arm part and the other end fixed to the fixing member and applying, to the fixing member and the shank, a biasing force in a direction in which the fixing member and the shank go away from each other, wherein: the first arm part includes a pair of abutting parts located at a predetermined spacing in the longitudinal direction, the pair of abutting parts abutting against an inner peripheral surface of the hollow shaft; the second arm part includes an interlocking part at an outer end thereof, the interlocking part being interlocked to a fixture fixed to a vehicle side; and the coil spring restricts the rotation of the shank around the first arm part.

According to a second aspect of the present application, the cargo net device of the first aspect further includes a cap fixed to the end of the hollow shaft, wherein the cap includes an insertion hole for supporting the first arm part in a slidable manner, and an abutting surface against which an abutting part of the first arm part on the second arm part side abuts.

According to a third aspect of the present application, in the cargo net device of the first aspect, the pair of abutting parts are a pair of parallel pins inserted to pass through the first arm part in a direction orthogonal to the longitudinal direction.

According to a fourth aspect of the present application, in the cargo net device of the first aspect, the one end of the coil spring is engaged with a notch passing through the first arm part in a direction orthogonal to the longitudinal direction, and the other end of the coil spring is engaged with a notch passing through the fixing member in the direction orthogonal to the longitudinal direction.

According to a fifth aspect of the present application, in the cargo net device of the first aspect, a unit including the fixing member, the coil spring and the shank is inserted into the hollow shaft, and the hollow shaft and the fixing member are fixed by caulking.

Effects of the Invention

According to the first aspect of the present application, a pair of abutting parts abutting against the inner peripheral surface of the hollow shaft are provided in the first arm part of the shank at a predetermined spacing in the longitudinal direction. This prevents the shank from tilting or rattling. Further, according to the first aspect of the present application, the coil spring restricts the rotation of the shank around the first arm part. This keeps the position of the shank such that the engaging part points in a predetermined direction, which allows the engaging part to be interlocked to the fixture fixed to a body with ease. In particular, according to the first aspect of the present application, the rotation of the shank is restricted with the use of the coil spring for obtaining the biasing force in the longitudinal direction. Accordingly, it is not required to provide a member for restricting the rotation separately from the coil spring, which does not increase the size of the cargo net device, the number of components or the weight. In addition, it is possible to absorb the external force applied to the shank in the rotation direction and absorb an error of the position at which the fixture and the engaging part are integrated, with the use of the elasticity of the coil spring in the torsional direction.

According to the second aspect of the present application, the shank can be supported with respect to the hollow shaft by a pair of abutting parts and a cap. This further prevents the shank from tilting or rattling. Moreover, in a case where one of the abutting parts abuts against the cap, the rotation of the shank can be restricted further by the friction between the abutting part and the cap.

According to the third aspect of the present application, a pair of abutting parts are a pair of parallel pins inserted to pass through the first arm part in the direction orthogonal to the longitudinal direction. This enables to easily form the abutting parts at low cost.

According to the fourth aspect of the present application, one end of the coil spring is engaged with the notch that passes through the first arm part in the direction orthogonal to the longitudinal direction, whereas the other end of the coil spring is engaged with the notch that passes through the fixing member in the direction orthogonal to the longitudinal direction. This allows both ends of the coil spring to be fixed to the fixing member as well as the first arm part with ease and reliability.

According to the fifth aspect of the present application, the unit including the fixing member, the coil spring and the shank is inserted into the hollow shaft, and then the hollow shaft and the fixing member are fixed by caulking, and hence the cargo net device can he assembled easily.

EMBODIMENTS FOR CARRYING OUT THE INVENTION

Preferred embodiments of the present invention are described below with reference to the drawings.

<1. Overall Configuration of Cargo Net Device>

Figure 1:
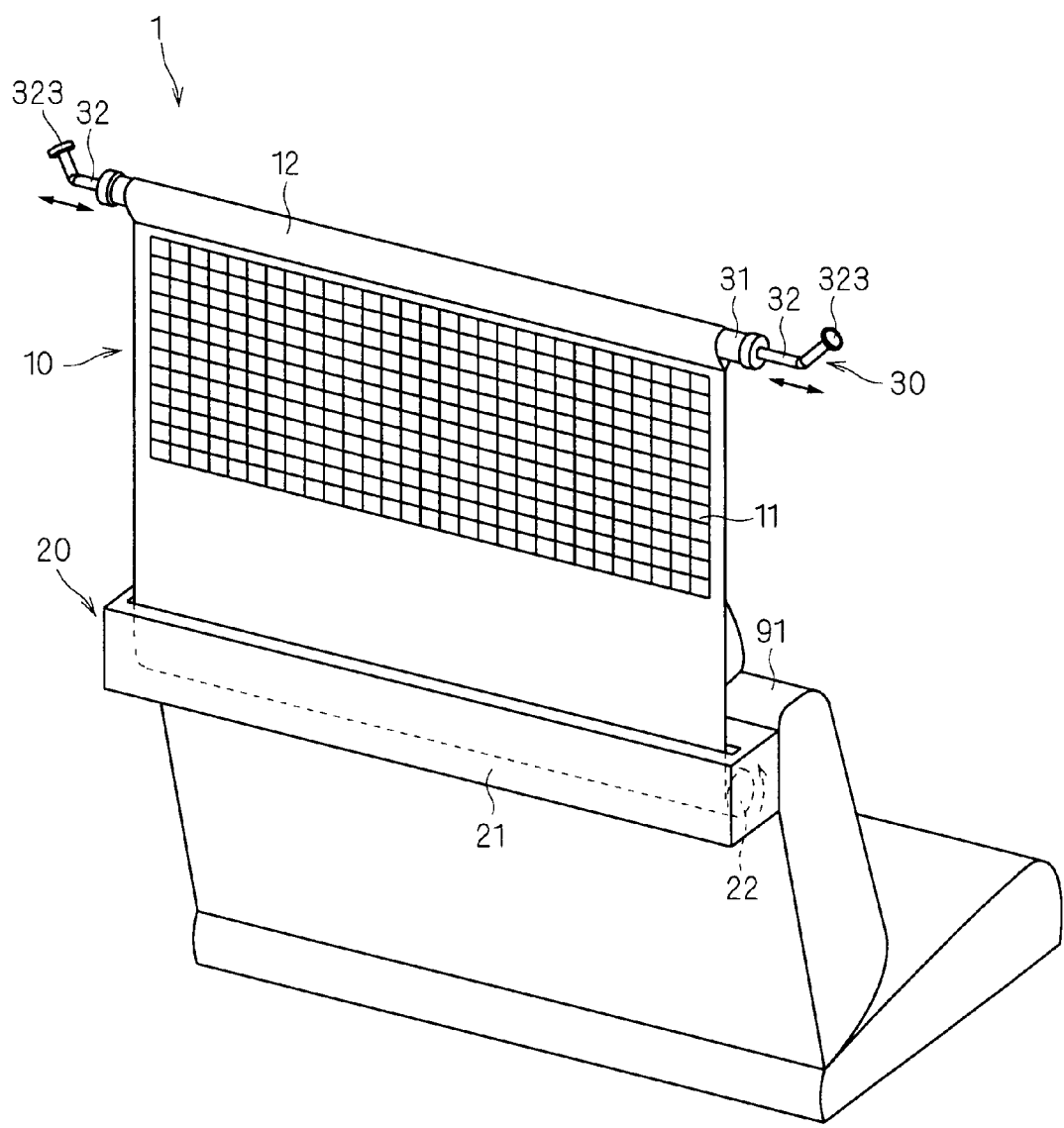
FIG. 1 is a perspective view of a cargo net device.

FIG. 1 is a perspective view of a cargo net device 1 according to an embodiment of the present invention. The cargo net device 1 is mounted as a partition between a passenger compartment and a cargo compartment of a vehicle for preventing the cargo loaded on the cargo compartment in the back of the vehicle from being thrown into the passenger compartment forward. As shown in FIG. 1, the cargo net device 1 mainly includes a net 10, a wind-up mechanism 20 and a stay 30.

The net 10 is a sheet-like member extended between the passenger compartment and the cargo compartment. The net 10 is formed, approximately in a rectangular shape, of fibers or a resin having the strength sufficient for standing the pressure from the cargo. The net 10 includes a netted window part 11. This allows a driver to have a good rear visibility through the window part 11 even in a state in which the net 10 is extended.

The lower edge of the net 10 is fixed to a wind-up shaft 22 of the wind-up mechanism 20, which is described below. The net 10 includes a bag part 12 sewn in a tubular shape that is formed in an upper edge thereof, and a hollow shaft 31 of the stay 30, which is described below, is inserted into the bag part 12.

The wind-up mechanism 20 is a mechanism for winding up the net 10 from the lower edge thereof to house the net 10 therein. The wind-up mechanism 20 includes a housing part 21 that is detachably fixed to the back of a seat 91 of the vehicle and the wind-up shaft 22 disposed inside the housing part 21. The wind-up shaft 22 holds the edge side of the lower portion of the net 10 and is biased in a direction (rotation direction indicated by a broken line in FIG. 1) for winding up the net 10. Further, the wind-up shaft 22 is provided with a lock mechanism (not shown) for restricting pulling of the net 10 upon application of an abrupt force in the direction in which the net 10 is pulled out.

The stay 30 is a portion that is extended along the upper edge side of the net 10 and serves as a handle when the net 10 is pulled out and extended. The stay 30 includes the hollow shaft 31 that is inserted into the bag part 12 formed in the upper edge of the net 10 and has an approximately cylindrical shape and a pair of shanks 32 partially inserted into the both ends of the hollow shaft 31.

The pair of shanks 32 slide in the longitudinal direction with respect to the hollow shaft 31, which allows the stay 30 to be retractable in the longitudinal direction (direction indicated by a solid arrow in FIG. 1). Further, an interlocking part 323 that is interlocked to a fixture 40 (see FIG. 3) fixed to the ceiling or side of the vehicle is formed at the outer end of the shank 32.

When the cargo net device 1 is mounted inside the vehicle, first, the wind-up mechanism 20 is fixed to the back of the seat 91. Then, the net 10 is pulled upward from the wind-up mechanism 20, and the interlocking parts 323 provided at both ends of the stay 30 are interlocked to the fixtures 40 (see FIG. 3) on the body and fixed.

As described above, the stay 30 is retractable in the longitudinal direction. This allows the stay 30 to extend and contract in accordance with a vehicle size, which can change the fixed positions of the interlocking parts 323.

<2. Structure of Stay>

Figure 2:
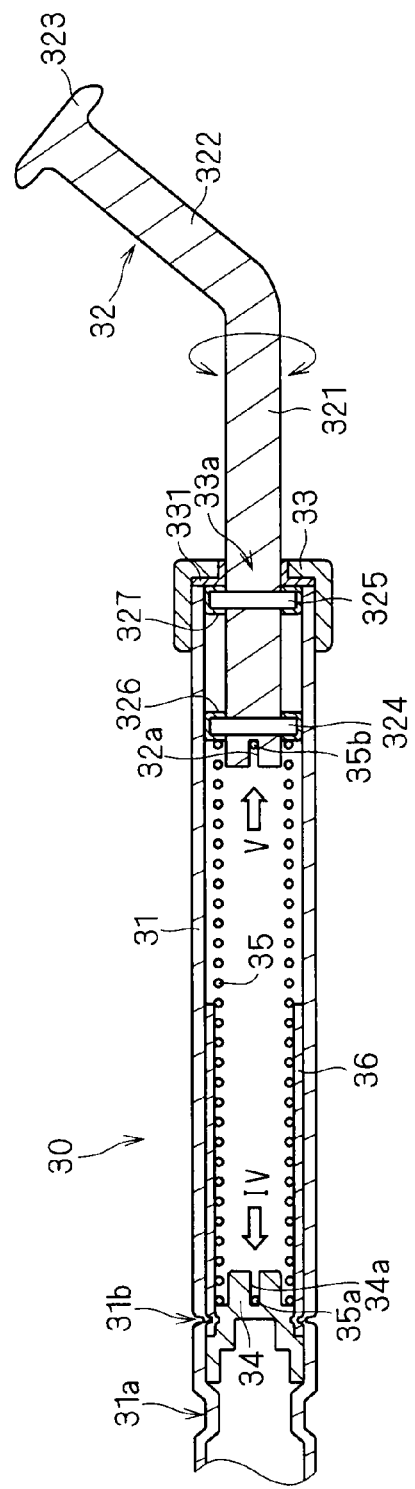
FIG. 2 is a longitudinal cross-sectional view of one end of a stay and its vicinities.
Figure 3:
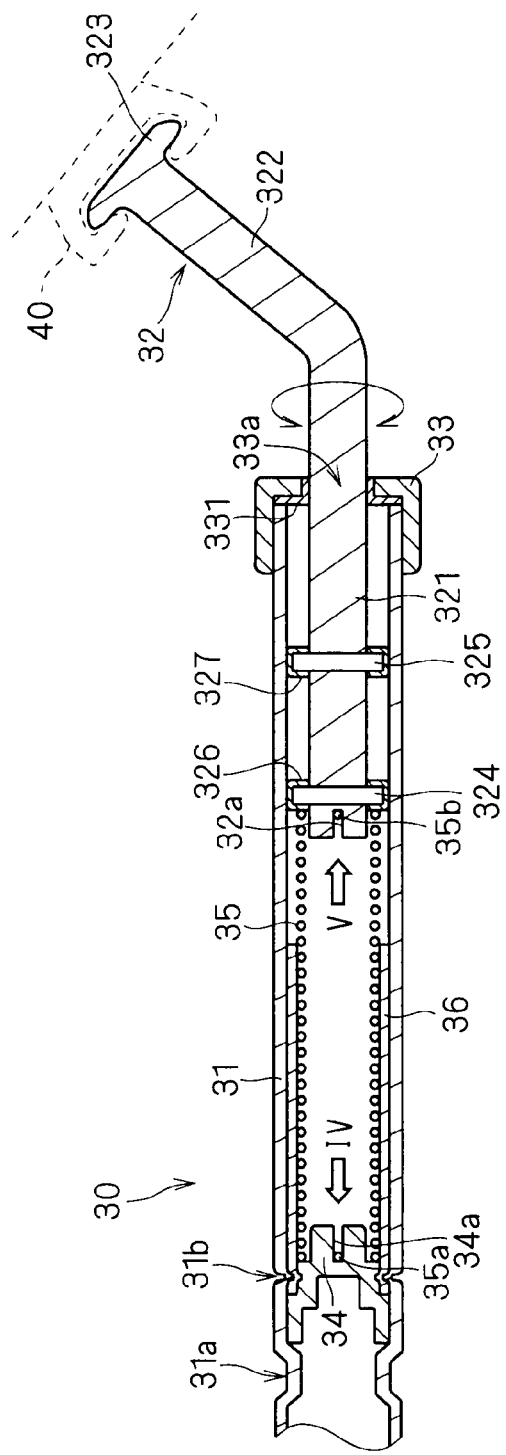
FIG. 3 is another longitudinal cross-sectional view of one end of the stay and its vicinities.

Next, a detailed structure of the stay 30 is described. FIG. 2 and FIG. 3 are longitudinal cross-sectional views of one end of the stay 30 and its vicinities. FIG. 2 shows the stay 30 in a state in which the interlocking part 323 is not interlocked to the fixture 40 (that is, state in which an external force in a direction for pushing does not act on the shank 32). While, FIG. 3 shows the stay 30 in a state in which the interlocking part 323 is interlocked to the fixture 40.

As described above, the stay 30 includes the hollow shaft 31 and the shanks 32 that slide in the longitudinal direction with respect to the hollow shaft 31. The hollow shaft 31 and the shank 32 are formed of, for example, metals such as stainless steel. As shown in FIG. 2 and FIG. 3, the stay 30 further includes retaining caps 33 fixed to the ends of the hollow shaft 31, and stoppers 34, coil springs 35 and soundproof tubes 36 that are disposed inside the hollow shaft 31.

The shank 32 is a bent cylindrical body that includes a first arm part 321 inserted into the hollow shaft 31 in a slidable manner along the longitudinal direction and a second arm part 322 extending from the outer end of the first arm part 321 obliquely upward with respect to the longitudinal direction. Formed at the inner end of the first arm part 321 is a notch 32a passing through the first arm part 321 in the direction orthogonal to the longitudinal direction. In addition, formed at the outer end of the second arm part 322 is the flange-shaped interlocking part 323.

The first arm part 321 of the shank 32 is provided with metal first parallel pin 324 and second parallel pin 325 that are inserted to pass therethrough in the direction orthogonal to the longitudinal direction. In addition, resin-made soundproof rings 326 and 327 are wound at the positions of the first arm part 321, where the first parallel pin 324 and second parallel pin 325 are provided, respectively. The first parallel pin 324 and the second parallel pin 325 slide in the longitudinal direction along the inner peripheral surface of the hollow shaft 31 while abutting against the inner peripheral surface of the hollow shaft 31 via the soundproof rings 326 and 327, respectively.

The first parallel pin 324 also abuts against the end of the coil spring 35 via the soundproof ring 326 and serves as a portion that receives the biasing force from the coil spring 35 to the shank 32. While, the second parallel pin 325 serves as a portion that abuts against the retaining cap 33 via the soundproof ring 327 and a cushion member 331 described below in the state (state of FIG. 2) in which the interlocking part 323 is not interlocked to the fixture 40.

The first parallel pin 324 and the second parallel pin 325 are provided at a predetermined spacing in the longitudinal direction of the first arm part 321. Accordingly, the first parallel pin 324 and the second parallel pin 325 abut against the inner peripheral surface of the hollow shaft 31 via the soundproof rings 326 and 327, respectively, which prevents the shank 32 from tilting or rattling.

The retaining cap 33 is a metal member fixed to the end of the hollow shaft 31. The retaining cap 33 has a insertion hole 33a for slidably supporting the first arm part 321 of the shank 32. The resin-made cushion member 331 is inserted between the end surface of the hollow shaft 31 and the retaining cap 33. The cushion member 331 includes a disc part positioned between the end surface of the hollow shaft 31 and the retaining cap 33 and a cylindrical part positioned between the first arm part 321 of the shank 32 and the retaining cap 33.

The inner end surface of the retaining cap 33 abuts against the second parallel pin 325 via the cushion member 331 and the soundproof ring 327 in the state of FIG. 2. This prevents the shank 32 from extending by a larger amount compared with the state shown in FIG. 2. Further, the cushion member 331 serves the function of reducing the noise caused by the sliding contact between the first arm part 321 and the retaining cap 33 and the noise caused by the abutting contact between the second parallel pin 325 and the retaining cap.

Further, the shank 32 is also supported by the insertion hole 33a of the retaining cap 33, in addition to the first parallel pin 324 and the second parallel pin 325. That is, the shank 32 is supported at three positions of the first parallel pin 324, the second parallel pin 325 and the retaining cap 33 with respect to the hollow shaft. This further prevents the shank 32 from tilting or rattling.

The stopper 34 is a member (fixing member) that is fixed to the inside of the hollow shaft 31 and supports an inner end 35a of the coil spring 35 in a fixed manner. The stopper 34 is fixed at the position at a predetermined spacing from the end of the hollow shaft 31 toward the center thereof. In addition, the stopper 34 abuts against the inner side surface of a recess 31a formed in the hollow shaft 31 and is fixed to the hollow shaft 31 by a caulking part 31b. Formed at the outer end of the stopper 34 is a notch 34a passing through the stopper 34 in the direction orthogonal to the longitudinal direction of the hollow shaft 31.

The coil spring 35 is an elastic member inserted between the stopper 34 and the shank 32 inside the hollow shaft 31. The end 35a (hereinafter, referred to as a "fixed end 35a") inside the coil spring 35 is engaged with and fixed to the notch 34a of the stopper 34. While, an outer end 35b (hereinafter, referred to as a "free end 35b") of the coil spring 35 is engaged with and fixed to the notch 32a of the shank 32.

Figure 4:
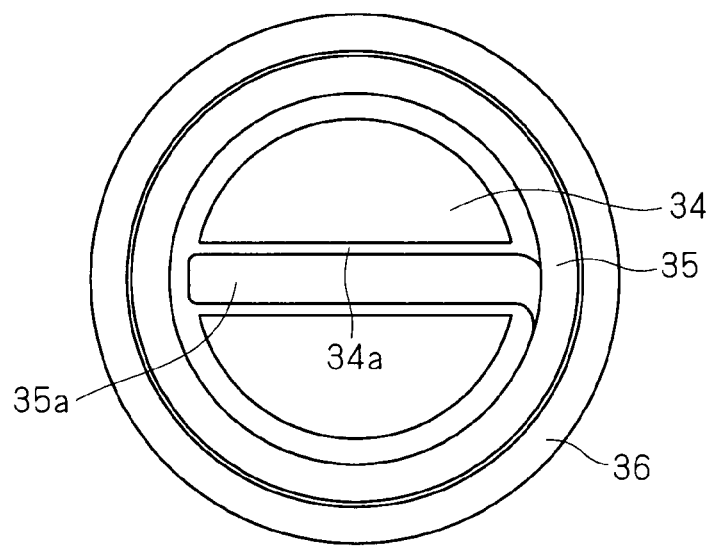
FIG. 4 is a view of an engaging portion of a stopper and a coil spring, which is viewed from a position IV of FIG. 2 and FIG. 3.
Figure 5:
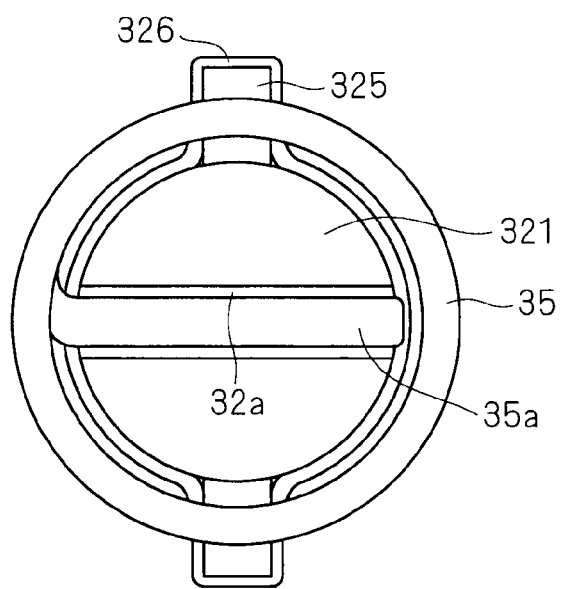
FIG. 5 is a view of an engaging portion of a shank and the coil spring, which is viewed from a position V of FIG. 2 and FIG. 3.

FIG. 4 is a view of an engaging portion of the stopper 34 and the fixed end 35a of the coil spring 35, which is viewed from a position IV of FIG. 2 and FIG. 3. In addition, FIG. 5 is a view of an engaging portion of the shank 32 and the free end 35b of the coil spring 35, which is viewed from a position V of FIG. 2 and FIG. 3. As shown in FIG. 4 and FIG. 5, the fixed end 35a and the free end 35b of the coil spring 35 are engaged with and fixed to the notches 34a and 32a formed in the direction orthogonal to the longitudinal direction, respectively. Accordingly, the fixed end 35a and the free end 35b of the coil spring 35 are fixed to the stopper 34 and the shank 32, respectively, with ease and reliability.

The coil spring 35 is interposed between the stopper 34 and the shank 32 in the state of being compressed compared with the natural length. This allows the coil spring 35 to apply the biasing force to the stopper 34 and the shank 32 in the direction in which they go away from each other. As a result, the shank 32 is biased in the direction in which it is pushed out of the hollow shaft 31.

In a case where the stay 30 is not mounted to the fixture 40, the coil spring 35 extends (in a range shorter than the natural length) and, as shown in FIG. 2, the second parallel pin 325 of the shank 32 abuts against the retaining cap 33 via the soundproof ring 327 and the cushion member 331. While, in a case where the stay 30 is mounted to the fixture 40, as shown in FIG. 3, the coil spring 35 is compressed more compared with the state shown in FIG. 2, in accordance with the position of the fixture 40.

In the state of FIG. 3, the shank 32 presses the fixture 40 outward by the biasing force applied from the coil spring 35. As a result, the stay 30 is tightened between a pair of fixtures 40. This prevents the stay 30 from rattling.

Further, the coil spring 35 according to the present embodiment also serves the function of restricting the rotation (rotation in a direction indicated by an arrow in FIG. 2 and FIG. 3) of the shank 32 around the first arm part 321 by the elastic force in the torsional direction thereof. As shown in FIG. 2 and FIG. 3, the shank 32 according to the present embodiment is disposed in a position (hereinafter, referred to as a "standard position") such that the interlocking part 323 points upward. An external force in the rotation direction acts on the second arm part 322 and the shank 32 tilts from the standard position, whereby the coil spring 35 is likely to return the shank 32 to the standard position by the elastic force thereof.

In this manner, the coil spring 35 restricts the rotation of the shank 32 from the standard position.

The elastic force of the coil spring 35 in the torsional direction is generated irrespective of the extension and contraction of the coil spring 35 in the longitudinal direction. Therefore, the shank 32 is kept approximately in the standard position in the state (state of FIG. 2) in which the interlocking part 323 is not interlocked to the fixture 40 as well as in the state (state of FIG. 3) in which the interlocking part 323 is interlocked to the fixture 40.

In the cargo net device 1 according to the present embodiment, the shank 32 is always kept in the standard position when the net 10 is pulled out from the wind-up mechanism 20 to fix the stay 30 to the fixture 40. As a result, a user does not need to manually adjust the rotation position of the shank 32. It is also possible for the user to, for example, lift the stay 30 with one hand not with both hands and subsequently interlock the interlocking part 323 to the fixture 40.

Note that the coil spring 35 does not completely prohibit the rotation of the shank 32 around the first arm part 321. When the external force in the rotation direction is applied to the shank 32, the coil spring 35 permits the shank 32 to rotate slightly in accordance with the external force. As a result, the external force applied to the shank 32 is absorbed, which prevents respective members of the stay 30 from being damaged. In addition, thanks to the elasticity in the torsional direction as described above, a slight amount of misalignment when the fixture 40 and the interlocking part 323 are interlocked to each other is absorbed as well, which facilitates interlocking.

Further, in the present embodiment, the rotation of the shank 32 is restricted with the use of the coil spring 35 for obtaining the biasing force in the longitudinal direction. The member for restricting the rotation is not provided separately from the coil spring 35, which does not increase the size of the stay 30 and the number of components or weight.

In particular, when the interlocking part 323 is not interlocked to the fixture 40, as shown in FIG. 2, the second parallel pin 325 and the retaining cap 33 abut against each other via the soundproof ring 327 and the cushion member 331. Further, in this state, the second parallel pin 325 is pressed against the fixture 40 side by the biasing force of the coil spring 35 in the longitudinal direction. Accordingly, the rotation of the shank 32 around the first arm part 321 is further restricted by the friction between the soundproof ring 327 and the cushion member 331.

Further, in the present embodiment, the first parallel pin 324 and the second parallel pin 325 abut against the inner peripheral surface of the hollow shaft 31 via the soundproof rings 326 and 327, respectively. For this reason, the rotation of the shank 32 is restricted also by the friction between the soundproof rings 326 and 327 and the hollow shaft 31.

A soundproof tube 36 is a resin-made cylindrical member that is fixed to the inner peripheral surface of the hollow shaft 31. The hollow shaft 31, soundproof tube 36 and stopper 34 are fixed by caulking in the step of assembling the stay 30 described below. The soundproof tube 36 is arranged between the inner peripheral surface of the hollow shaft 31 and the coil spring 35, which prevents the inner peripheral surface of the hollow shaft 31 and the coil spring 35 from directly contacting each other to reduce the noise generated caused by the extension and contraction and torsion of the coil spring 35.

Note that while FIG. 2 and FIG. 3 show the structure of one end of the stay 30 and its vicinities, the other end and its vicinities have a similar structure as well.

<3. Assembly Process of Stay>

Figure 6:
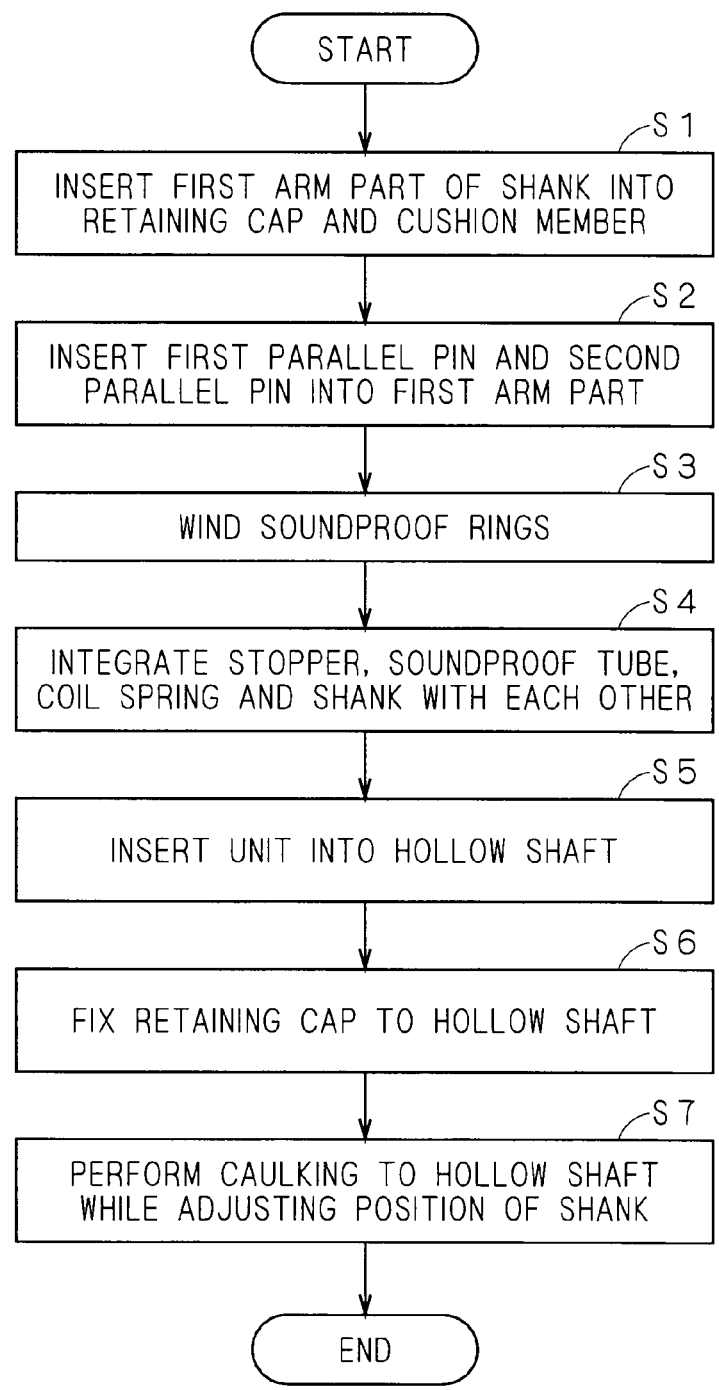
FIG. 6 is a flowchart showing the process of stay assembly.

Next, the assembly process of the stay 30 is described with reference to the flowchart of FIG. 6 and the perspective views of FIG. 7 to FIG. 13.

Figure 7:
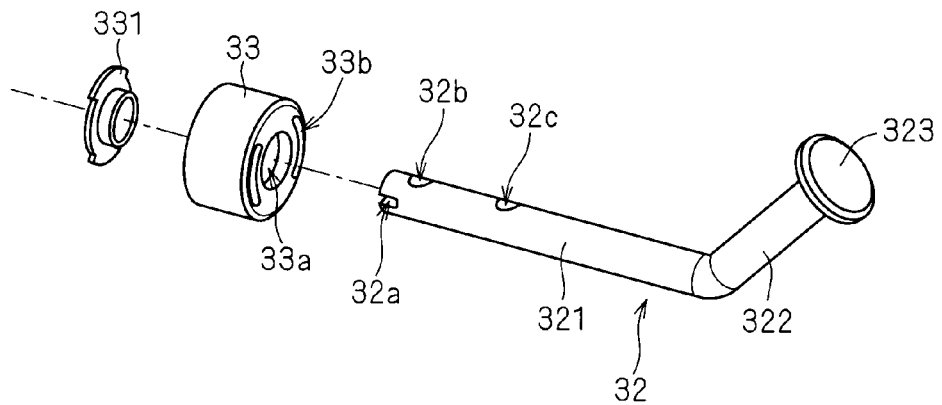
FIG. 7 is a perspective view showing the state of stay assembly.
Figure 8:
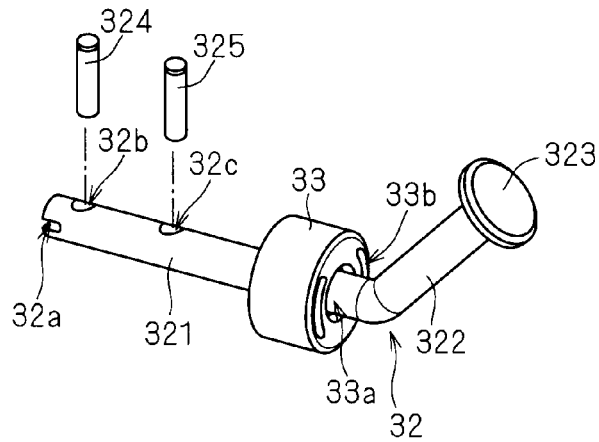
FIG. 8 is a perspective view showing the state of stay assembly.

In assembly of the stay 30, first, the first arm part 321 of the shank 32 is inserted into the retaining cap 33 and the cushion member 331 (Step S1, FIG. 7). Then, the first parallel pin 324 and the second parallel pin 325 are inserted into two insertion holes 32b and 32c that are formed in the first arm part 321 of the shank 32 at a spacing in the axis direction (Step S2, FIG. 8).

Figure 9:
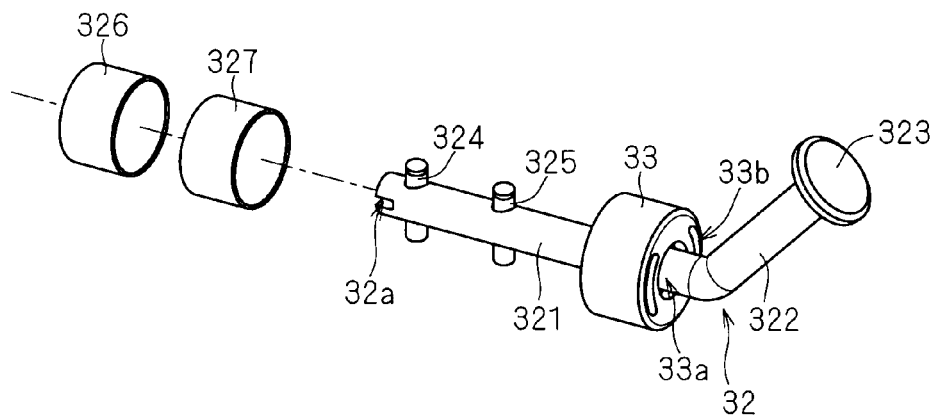
FIG. 9 is a perspective view showing the state of stay assembly.
Figure 10:
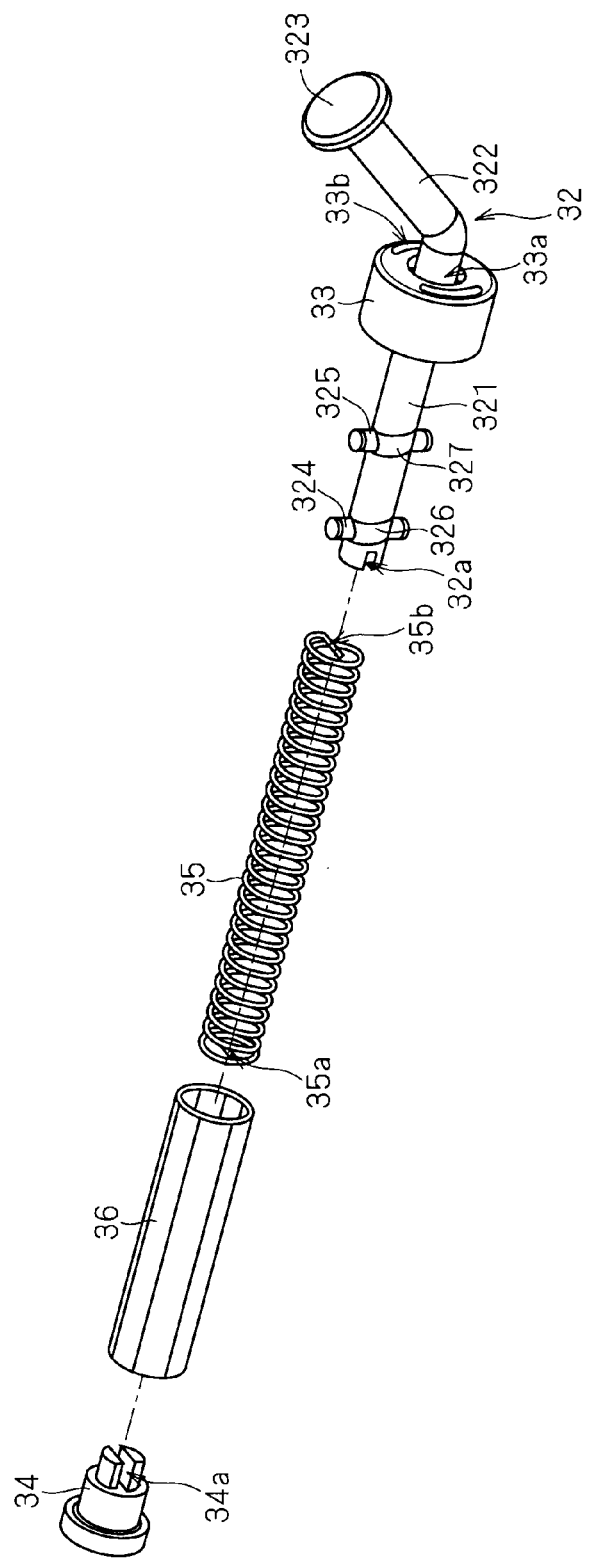
FIG. 10 is a perspective view showing the state of stay assembly.

Then, the soundproof rings 326 and 327 are wound at the positions of the first arm part 321 where the first parallel pin 324 and the second parallel pin 325 are inserted, respectively (Step S3, FIG. 9). The soundproof rings 326 and 327, which are made of, for example, a heat-shrinkable resin, are inserted into the first arm part 321 and then applied with heat so as to adhere to the first parallel pin 324 and the second parallel pin 325, respectively.

Subsequently, the soundproof tube 36 is integrated with the stopper 34, and then the coil spring 35 is inserted into the soundproof tube 36. Then, the fixed end 35a of the coil spring 35 is engaged with the notch 34a of the stopper 34 and, the free end 35b of the coil spring 35 is engaged with the notch 32a of the shank 32 (Step S4, FIG. 10).

Figure 11:
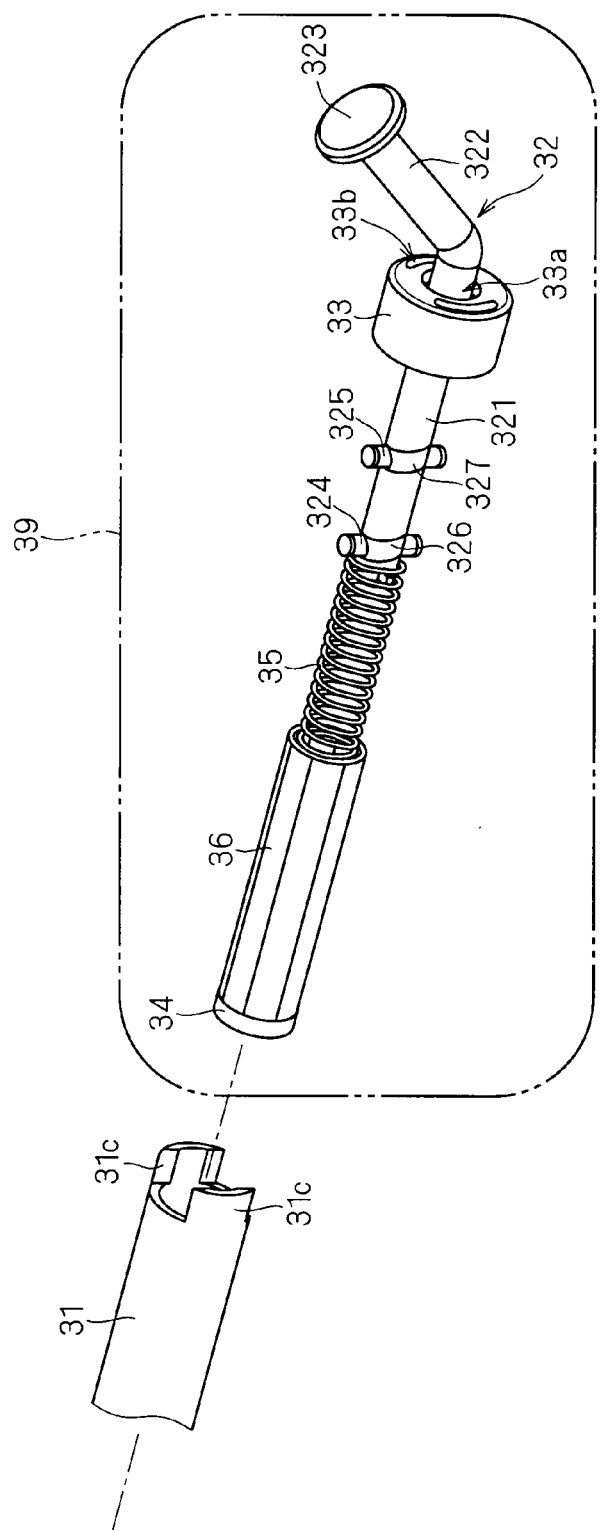
FIG. 11 is a perspective view showing the state of stay assembly.
Figure 12:
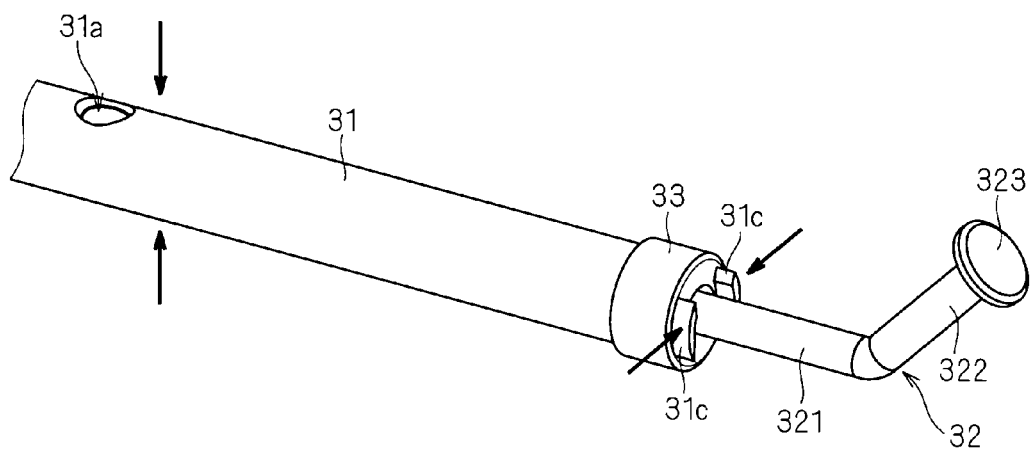
FIG. 12 is a perspective view showing the state of stay assembly.

After that, a unit 39 including the stopper 34, the soundproof tube 36, the coil spring 35 and the shank 32 is inserted into the hollow shaft 31 (Step S5, FIG. 11). The stopper 34 is inserted to reach the inner side surface of the recess 31a of the hollow shaft 31. The retaining cap 33 is pushed to reach the position of the end of the hollow shaft 31, whereby the coil spring 35 is compressed more compared with the natural length. The retaining cap 33 and the hollow shaft 31 are integrated with each other by inserting projections 31c formed in the hollow shaft 31 into interlocking holes 33b formed in the retaining cap 33.

Further, the projections 31c inserted into the interlocking holes 33b of the retaining cap 33 are folded inward by caulking. As a result, the retaining cap 33 is fixed to the hollow shaft 31 (Step S6, FIG. 12). In addition, caulking is performed at the location of the hollow shaft 31 on the side slightly closer to the end compared with the recess 31a while adjusting the position of the shank 32 such that the interlocking part 323 points upward (Step S7, FIG. 12). This allows the soundproof tube 36 and the stopper 34 to be fixed to the hollow shaft 31 more firmly and the standard position of the shank 33 to be set such that the interlocking part 323 points upward.

Figure 13:
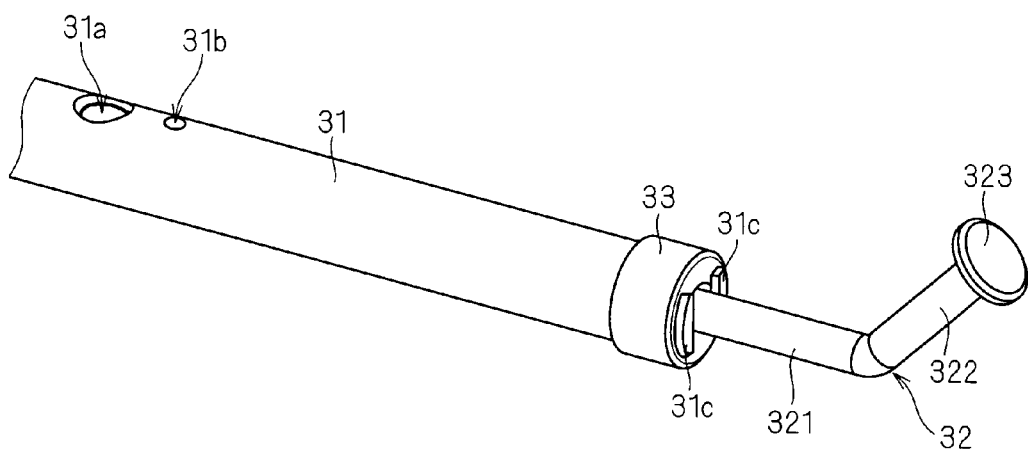
FIG. 13 is a perspective view showing the state of stay assembly.

As a result, the assembly of the stay 30 is finished (FIG. 13).

As described above, in the present embodiment, the stopper 34, the soundproof tube 36, the coil spring 35 and the shank 32 can be integrated into the unit 39. In assembling the stay 30, the above-mentioned unit 39 is inserted into the hollow shaft 31, and then the hollow shaft 31, the soundproof tube 36 and the stopper 34 are fixed by caulking. This allows the stay 30 to be assembled easily.

<4. Modifications>

While one embodiment of the present invention is described above, the present invention is not limited to the above-mentioned embodiment.

While the net 10 is formed approximately in a rectangular shape in the above-mentioned embodiment, the net 10 may be formed in the other shape. For example, the net 10 may be formed in a trapezoidal shape in accordance with the shape of a vehicle.

Further, while the wind-up mechanism 20 is fixed to the back of the seat 91 in the above-mentioned embodiment, the wind-up mechanism 20 may be fixed to the floor of the cargo compartment.

Further, while a pair of shanks 32 provided at both ends of the hollow shaft 31 are slidable in the longitudinal direction with respect to the hollow shaft 31 in the above-mentioned embodiment, it suffices that at least one of the shanks 32 is slidable in the longitudinal direction with respect to the hollow shaft 31.

Further, while the state in which the interlocking part 323 points upward is taken as the standard position of the shank 32 in the above-mentioned embodiment, the position for facilitating interlocking thereof may be taken as the standard position in accordance with the shapes of the fixture 40 and the interlocking part 323. Accordingly, the state in which the interlocking part 323 points in the direction other than upward direction may be taken as the standard position of the shank 32.

Further, while a pair of parallel pins 324 and 325 inserted into the first arm part 321 of the shank 32 abut against the inner peripheral surface of the hollow shaft 31 in the above-mentioned embodiment, abutting members having other shape may be provided in the first arm part 321, in place of those parallel pins 324 and 325. For example, a pair of flanged members may be fixed to the first arm part 321 at a spacing such that the end surfaces of the flanged members abut against the inner peripheral surface of the hollow shaft 31. Note that if a pair of parallel pins 324 and 325 are inserted into the first arm part 321 as in the above-mentioned embodiment, it is possible to easily form an abutting part against the hollow shaft 31 at low cost.

DESCRIPTION OF REFERENCE SYMBOLS 1 cargo net device
10 net
20 wind-up mechanism
30 stay
31 hollow shaft
31a recess
31b caulking part
32 shank
32a notch
33 retaining cap
33a insertion hole
34 stopper
34a notch
35 coil spring
36 soundproof tube
39 unit
40 fixture
321 first am part
322 second arm part
323 interlocking part
324 first parallel pin
325 second parallel pin
326, 327 soundproof ring
331 cushion member

The invention claimed is:

1. A cargo net device mounted as a partition between a passenger compartment and a cargo compartment of a vehicle, comprising:
a net;
a wind-up mechanism fixed to a back of a seat of said passenger compartment or a floor of said cargo compartment and winding up said net from a lower edge thereof;
a hollow shaft extended along an upper edge side of said net and attached to said net;
a fixing member fixed, in said hollow shaft, at a position apart from an end toward a center side thereof by a predetermined length;
a shank including:
a first arm part inserted into said hollow shaft so as to be slidable along a longitudinal direction thereof; and
a second arm part extending from an outer end of said first arm part obliquely with respect to said longitudinal direction; and
a coil spring including one end fixed to said first arm part and the other end fixed to said fixing member and applying, to said fixing member and said shank, a biasing force in a direction in which said fixing member and said shank go away from each other, wherein:
said first arm part includes a pair of abutting parts located at a predetermined spacing in said longitudinal direction, the pair of abutting parts abutting against an inner peripheral surface of said hollow shaft;
said second arm part includes an interlocking part at an outer end thereof, the interlocking part being interlocked to a fixture fixed to a vehicle side; and
said coil spring restricts the rotation of said shank around said first arm part.

2. The cargo net device according to claim 1, further comprising a cap fixed to said end of said hollow shaft,
wherein said cap includes:
an insertion hole for supporting said first arm part in a slidable manner; and
an abutting surface against which an abutting part of said first arm part on said second arm part side abuts.

3. The cargo net device according to claim 1, wherein said pair of abutting parts are a pair of parallel pins inserted to pass through said first arm part in a direction orthogonal to said longitudinal direction.

4. The cargo net device according to claim 1, wherein:
said one end of said coil spring is engaged with a notch passing through said first arm part in a direction orthogonal to said longitudinal direction; and
said other end of said coil spring is engaged with a notch passing through said fixing member in the direction orthogonal to said longitudinal direction.

5. The cargo net device according to claim 1, wherein:
a unit including said fixing member, said coil spring and said shank is inserted into said hollow shaft; and
said hollow shaft and said fixing member are fixed by caulking.

6. The cargo net device according to claim 1, further comprising a soundproof ring disposed on each of the abutting parts.

7. The cargo net device according to claim 1, further comprising:
a cap fixed to said end of said hollow shaft; and
a cushion member disposed between the end of the hollow shaft and the cap.

8. The cargo net device according to claim 1, further comprising a soundproof tube inserted within the hollow shaft and surrounding at least a portion of the coil spring.

* * * * *